(12) United States Patent
Kinuta et al.

(10) Patent No.: US 12,518,499 B2
(45) Date of Patent: Jan. 6, 2026

(54) RECOGNITION DEVICE AND RECOGNITION METHOD

(71) Applicant: FUJI CORPORATION, Chiryu (JP)

(72) Inventors: Minoru Kinuta, Nagoya (JP);
Toshinori Shimizu, Kariya (JP)

(73) Assignee: FUJI CORPORATION, Chiryu (JP)

( * ) Notice: Subject to any disclaimer, the term of this patent is extended or adjusted under 35 U.S.C. 154(b) by 96 days.

(21) Appl. No.: 18/569,438

(22) PCT Filed: Jun. 25, 2021

(86) PCT No.: PCT/JP2021/024178
§ 371 (c)(1),
(2) Date: Dec. 12, 2023

(87) PCT Pub. No.: WO2022/269912
PCT Pub. Date: Dec. 29, 2022

(65) Prior Publication Data
US 2024/0265662 A1    Aug. 8, 2024

(51) Int. Cl.
*G03B 17/02* (2021.01)
*G06V 10/14* (2022.01)
(Continued)

(52) U.S. Cl.
CPC .............. *G06V 10/14* (2022.01); *G06V 10/28* (2022.01); *G06V 10/993* (2022.01); *H04N 23/73* (2023.01);
(Continued)

(58) Field of Classification Search
CPC ...... G06V 10/14; G06V 10/28; G06V 10/993; G06V 2201/06; H04N 23/73; H05K 13/081; H05K 13/0813; H05K 13/0812
See application file for complete search history.

(56) References Cited

U.S. PATENT DOCUMENTS

| 4,204,756 A * | 5/1980 | Kobori | G03B 17/20 |
| | | | 396/290 |
| 6,546,202 B1 * | 4/2003 | Onozuka | G02B 7/102 |
| | | | 396/448 |

(Continued)

FOREIGN PATENT DOCUMENTS

WO    WO 2018/047252 A1    3/2018

OTHER PUBLICATIONS

International Search Report Issued Sep. 7, 2021, in PCT/JP2021/024178, filed on Jun. 25, 2021, citing documents 15 therein, 2 pages.

*Primary Examiner* — Philip P. Dang
(74) *Attorney, Agent, or Firm* — Oblon, McClelland, Maier & Neustadt, L.L.P.

(57) ABSTRACT

An image analysis section executes instruction processing to image electronic component while changing a shutter speed of measurement camera between a predetermined lower limit speed and a predetermined upper limit speed calculation processing of comparing an image of lower surface of each lead included in each of multiple imaging data acquired from the measurement camera with an ideal image of lower surface of each lead included in ideal imaging data to calculate a missing rate at which the image of lower surface of each lead is missing with respect to the ideal image for each of the multiple imaging data, detection processing of detecting imaging data having a missing rate equal to or less than a predetermined first threshold among multiple missing rates calculated by the calculation processing, and selection processing of selecting a shutter speed used for capturing the imaging data detected by the detection processing.

6 Claims, 7 Drawing Sheets

(51) Int. Cl.
  *G06V 10/28* (2022.01)
  *G06V 10/98* (2022.01)
  *H04N 23/73* (2023.01)
  *H05K 13/08* (2006.01)

(52) U.S. Cl.
  CPC ....... H05K 13/081 (2018.08); *G06V 2201/06* (2022.01)

(56) References Cited

U.S. PATENT DOCUMENTS

| | | | | |
|---|---|---|---|---|
| 6,554,498 B2 * | 4/2003 | Onozuka | ................ | G03B 17/14 396/448 |
| 6,575,642 B2 * | 6/2003 | Nozawa | ................... | G02B 7/10 396/448 |
| 6,597,515 B2 * | 7/2003 | Nozawa | ............... | G02B 15/143 359/694 |
| 6,903,879 B2 * | 6/2005 | Nozawa | ................. | G02B 7/102 359/699 |
| 7,576,845 B2 * | 8/2009 | Asakura | ................ | G01J 3/0208 356/73 |
| 8,330,800 B2 * | 12/2012 | Endo | ......................... | G06T 7/60 348/46 |
| 8,675,094 B2 * | 3/2014 | Katsumata | ............. | H04N 23/70 348/226.1 |
| 9,497,433 B2 * | 11/2016 | Noda | ...................... | H04N 9/643 |
| 9,641,742 B2 * | 5/2017 | Takamiya | ............. | H04N 23/667 |
| 10,284,771 B2 * | 5/2019 | Tsuchiya | ............... | G03B 15/00 |
| 10,339,666 B2 * | 7/2019 | Nozawa | ................. | G06T 7/0004 |
| 10,425,615 B2 * | 9/2019 | Wang | ..................... | G09G 5/005 |
| 11,702,106 B1 * | 7/2023 | Poubel Orenstein | ........................ | G05D 1/0088 701/26 |
| 2021/0161044 A1 | 5/2021 | Nagaishi | | |

* cited by examiner

RECOGNITION DEVICE AND RECOGNITION METHOD

TECHNICAL FIELD

The present disclosure relates to a recognition device and a recognition method for recognizing a state of a predetermined characteristic portion of a component to be mounted on a board.

BACKGROUND ART

Patent Literature 1 discloses a recognition device that images, via an imaging device, a distal end of a lead of a lead component multiple times at different shutter speeds to create multiple imaging data, determines whether a distal end position of the lead is recognizable based on each of the multiple imaging data, and determines, as an optimum shutter speed, a shutter speed between a highest shutter speed and a lowest shutter speed among shutter speeds during the imaging in accordance with the imaging data determined to be recognizable.

PATENT LITERATURE

Patent Literature 1: International Publication No. WO 2018/047252 A1

BRIEF SUMMARY

Technical Problem

Here, in the image of the created imaging data, a missing rate is changed in accordance with the shutter speed during the imaging. Therefore, in a case where image recognition is performed based on the imaging data, when the accuracy of the image recognition is to be improved, the imaging data in which the missing rate of the image is less is required. Accordingly, it is required to select a shutter speed at which the missing rate of the image is equal to or less than a predetermined threshold as the shutter speed when the imaging data is created.

However, in the recognition device described in Patent Literature 1, it is not taken into consideration that the missing rate of the image of the created imaging data is changed in accordance with the shutter speed during the imaging.

An object of the present disclosure is to provide a recognition device and a recognition method capable of selecting a shutter speed at which a missing rate of an image of created imaging data is equal to or less than a predetermined threshold.

Solution to Problem

In order to achieve the object described above, a recognition device of the present disclosure recognizes a state of a predetermined characteristic portion of a component to be mounted on a board, the recognition device including a light source configured to apply light to the component including the predetermined characteristic portion, an imaging device configured to image the component that has received the light applied by the light source, and an image analysis device configured to perform image analysis of imaging data, which is captured by the imaging device and acquired from the imaging device, to recognize the state of the predetermined characteristic portion of the component, in which the image analysis device is configured to execute instruction processing of instructing the imaging device to image the component while changing a shutter speed of the imaging device between a predetermined lower limit speed and a predetermined upper limit speed, calculation processing of comparing an image of the predetermined characteristic portion included in each of multiple imaging data acquired from the imaging device in accordance with the instruction processing with an ideal image of the predetermined characteristic portion included in ideal imaging data to calculate a missing rate at which the image of the predetermined characteristic portion is missing with respect to the ideal image for each of the multiple imaging data, detection processing of detecting imaging data having a missing rate equal to or less than a predetermined first threshold among multiple missing rates calculated by the calculation processing, and selection processing of selecting a shutter speed used for capturing the imaging data detected by the detection processing.

Advantageous Effects

According to the present disclosure, it is possible to select the shutter speed at which the missing rate of the image of the created imaging data is equal to or less than the predetermined first threshold.

DESCRIPTION OF EMBODIMENTS

Figure 1:
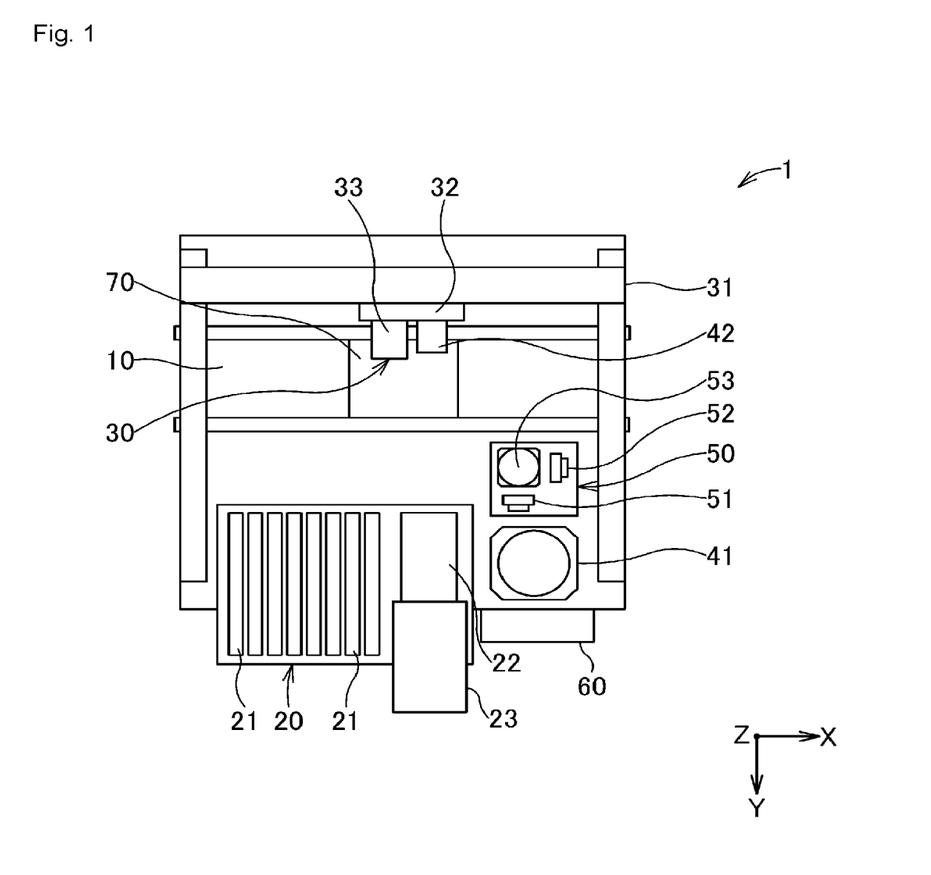
FIG. 1 is a plan view illustrating an entire component mounting machine according to an embodiment of the present disclosure.

An embodiment of the present disclosure will be described in detail below based on the accompanying drawings. FIG. 1 illustrates component mounting machine 1. Component mounting machine 1 is a device that executes mounting work of an electronic component on circuit board 70. As illustrated in FIG. 1, component mounting machine 1 includes board conveyance device 10, component supply device 20, component transfer device 30, part camera 41, board camera 42, recognition device 50, and control device 60. In the following description, a horizontal width direction (for example, a left-right direction in FIG. 1) of component mounting machine 1 is defined as an X-axis direction, a horizontal longitudinal direction (for example, an up-down direction in FIG. 1) of component mounting machine 1 is defined as a Y-axis direction, and a vertical direction (for example, a front-rear direction in FIG. 1) perpendicular to the X axis and the Y axis is defined as a Z-axis direction.

Board conveyance device 10 includes a belt conveyor or the like and conveys circuit boards 70 subsequently in a conveyance direction. Board conveyance device 10 positions circuit board 70 at a predetermined position in the machine of component mounting machine 1. After a mounting process is executed by component mounting machine 1, board conveyance device 10 carries circuit board 70 out of component mounting machine 1.

Component supply device 20 supplies an electronic component to be mounted on circuit board 70. Component supply device 20 has multiple slots arranged side by side in the X-axis direction. Feeders 21 are detachably set in the multiple slots, respectively. Component supply device 20 feeds and moves a carrier tape by feeder 21 and supplies the electronic component at an extraction portion located on a distal end side (for example, an upper side in FIG. 1) of feeder 21.

Component supply device 20 supplies a relatively large electronic component, such as a lead component, in a state of being arranged on tray 22. Component supply device 20 accommodates multiple trays 22 in accommodation shelve 23 partitioned in the up-down direction, and pulls out predetermined tray 22 in accordance with the mounting process to supply the electronic component, such as a lead component.

Component transfer device 30 is configured to move in the X-axis direction and the Y-axis direction. Component transfer device 30 is disposed from a rear side (for example, the upper side in FIG. 1) in the longitudinal direction of component mounting machine 1 to an upper side of component supply device 20 on a front side of component mounting machine 1. Component transfer device 30 includes head drive device 31, moving body 32, and mounting head 33. Head drive device 31 is configured to move moving body 32 in the XY-axis direction with a linear motion mechanism.

Mounting head 33 is a holding device that is detachably provided on moving body 32 of head drive device 31 and holds the electronic component. Further, mounting head 33 supports multiple suction nozzles 34 (see FIG. 3) detachably provided in multiple nozzle holders. Mounting head 33 supports suction nozzles 34 individually in such a manner as to be rotatable around an R-axis parallel to a Z-axis and capable of being lifted and lowered.

Each of suction nozzles 34 controls a lifting and lowering position (Z-axis direction position), an angle, or a supply state of a negative pressure with respect to mounting head 33. When the negative pressure is supplied, suction nozzle 34 picks up and holds the electronic component supplied to the extraction portion of feeder 21 and the electronic component supplied from tray 22. With such a configuration, mounting head 33 of the present embodiment holds the electronic component by pickup.

Part camera 41 and board camera 42 are digital imaging devices including an imaging element, such as a charge coupled device (CCD) or a complementary metal oxide semiconductor (CMOS). Part camera 41 and board camera 42 image a range that falls within a camera visual field based on a control signal from communicably connected control device 60, and transmit imaging data acquired by the imaging to control device 60.

Part camera 41 is fixed to a base of component mounting machine 1 such that an optical axis is directed in the vertical direction (for example, in the Z-axis direction) and is configured to perform the imaging from below component transfer device 30. More specifically, part camera 41 is configured to image a lower surface of the electronic component in a state of being held by suction nozzle 34. Specifically, a lens unit of part camera 41 is set to focus on a target object at a certain distance from the imaging element. The camera visual field of the lens unit of part camera 41 is set to a size within which all suction nozzles 34 supported by mounting head 33 fall.

Board camera 42 is provided on moving body 32 of component transfer device 30 such that the optical axis faces downward in the vertical direction (Z-axis direction). Board camera 42 is configured to image circuit board 70. Control device 60 that acquires the imaging data from board camera 42 recognizes a positioning state of circuit board 70 by board conveyance device 10 by recognizing, for example, a positioning mark attached to the board by image processing. Then, control device 60 corrects the position of moving body 32 in accordance with the positioning state of circuit board 70, and controls the mounting process so that the electronic component is mounted.

Recognition device 50 measures a three-dimensional position (space position indicated by three-dimensional coordinates) of a measurement point set in the electronic component. It is noted that recognition device 50 includes image analysis section 62 provided in next control device 60, and thus recognition device 50 will be described in detail later.

Figure 2:
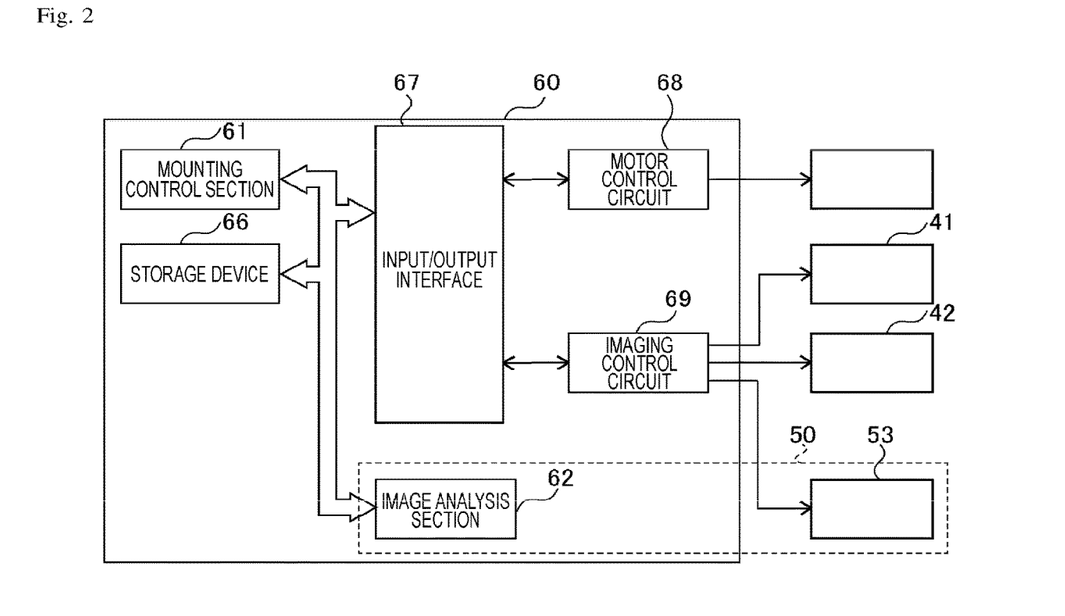
FIG. 2 is a block diagram illustrating a control device of the component mounting machine to which a recognition device is applied.

Control device 60 mainly includes CPU, various memories, a display, or a control circuit. Control device 60 controls the mounting process of mounting the electronic component on circuit board 70 based on the imaging data acquired by the imaging of part camera 41 and board camera 42 and a determination result of appropriateness of the electronic component by recognition device 50 described later. In control device 60, as illustrated in FIG. 2, input/output interface 67 is connected to mounting control section 61, image analysis section 62, and storage device 66 via a bus. Motor control circuit 68 and imaging control circuit 69 are connected to input/output interface 67.

Mounting control section 61 controls the position of mounting head 33 or an operation of a pickup mechanism via motor control circuit 68. More specifically, mounting control section 61 inputs information output from various types of multiple sensors provided in component mounting machine 1 or results of various types of recognition processing. Mounting control section 61 transmits a control signal to motor control circuit 68 based on a control program stored in storage device 66, the information from various sensors, and the results of the image processing or the recognition processing. As a result, the position and the rotation angle of suction nozzle 34 supported by mounting head 33 are controlled.

Since image analysis section 62 constitutes recognition device 50 described later, the configuration of recognition device 50 will be described in detail. Storage device 66 includes an optical drive device, such as a hard disk device, or a flash memory. Storage device 66 stores a control program for operating component mounting machine 1, the imaging data transferred from part camera 41 and board camera 42 to control device 60 via a bus or a communication cable, temporary data of the image processing by recognition device 50, and the like. Input/output interface 67 is interposed between CPU or storage device 66 and each of control circuits 68 and 69, and converts the data format or adjusts the signal intensity.

Motor control circuit 68 is used to control each axis motor provided in component transfer device 30 based on the control signal from mounting control section 61. As a result, mounting head 33 is positioned in each axial direction. Further, by controlling the motors of the respective axes, the lifting and lowering position (Z-axis direction position) and the rotation angle of predetermined suction nozzle 34 are computed.

Imaging control circuit 69 controls the imaging by part camera 41, board camera 42, and measurement camera 53 of recognition device 50 based on the control signal for the imaging transmitted from control device 60. In addition, imaging control circuit 69 acquires the imaging data obtained by the imaging of part camera 41, board camera 42, and measurement camera 53, and stores the imaging data in storage device 66 via input/output interface 67.

Recognition device 50 is a device that determines the appropriateness of the electronic component. In the present embodiment, recognition device 50 is incorporated to constitute a part of component mounting machine 1. Recognition device 50 sets the electronic component held by pickup by suction nozzle 34 of component transfer device 30 as a target of the appropriateness determination.

Here, the electronic component that is the target of the appropriateness determination by recognition device 50 is an electronic component having a component main body and multiple electrode portions. The electrode portion of the electronic component is provided on the component main body, and is electrically connected to the land of circuit board 70 after the electronic component is placed on circuit board 70. Specifically, the electrode portion is a lead of a lead component or a protruding terminal of a chip component. In the following description, the description will be made on the assumption that electronic component 80 that is the target of the appropriateness determination is the lead component.

Figure 3:
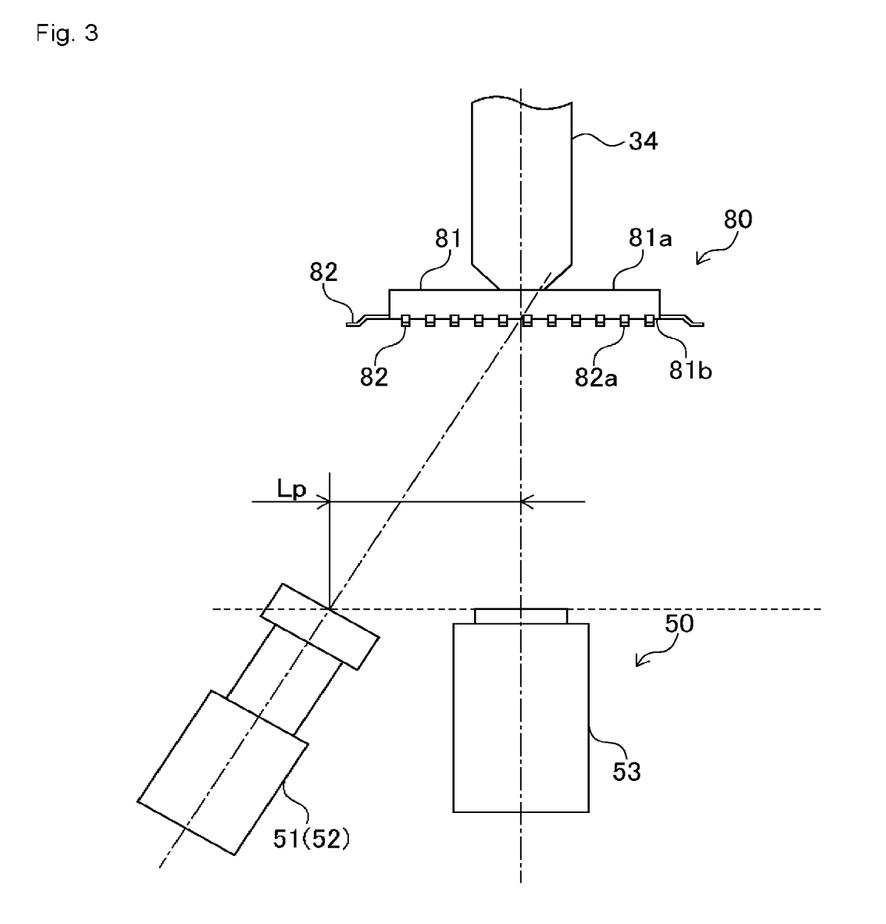
FIG. 3 is a schematic diagram illustrating a positional relationship between a suction nozzle and a measurement unit.

As illustrated in FIG. 3, electronic component 80 includes component main body 81 and leads 82 corresponding to the multiple electrode portions. In electronic component 80 held by mounting head 33, an outer surface of component main body 81 and outer surfaces of multiple leads 82 facing a side opposite to a side of mounting head 33 (lower side in the vertical direction) are defined as "inspection surfaces". That is, as illustrated in FIG. 3, in a state where electronic component 80 is held by pickup in an appropriate posture, that is, in a state where a main body upper surface of component main body 81 is pickup surface 81a picked up by suction nozzle 34, main body lower surface 81b of component main body 81 and lead lower surface 82a of lead 82 are "inspection surfaces". On the other hand, in a state where electronic component 80 is held upside down, that is, in a state where main body lower surface 81b is the pickup surface, the main body upper surface of component main body 81 and a lead upper surface of lead 82 are "inspection surfaces".

Recognition device 50 measures the three-dimensional position of the measurement point set in electronic component 80. In the present embodiment, recognition device 50 measures the three-dimensional position of each measurement point by measuring a three-dimensional shape (hereinafter, also simply referred to as "three-dimensional shape") of the inspection surface indicated by the three-dimensional coordinates.

Recognition device 50 includes two projectors 51 and 52 and measurement camera 53 that acquire the imaging data used to measure the three-dimensional shape, and image analysis section 62 (see FIG. 2) that constitutes a part of control device 60. Two projectors 51 and 52 and measurement camera 53 are fixed to the base of component mounting machine 1. Two projectors 51 and 52 are devices that are disposed at positions shifted by 90° about the optical axis of measurement camera 53 and project predetermined pattern light onto a target object that is a measurement target of the three-dimensional shape.

Each of two projectors 51 and 52 generates the predetermined pattern light from the light of the light source by a slit, a transmissive liquid crystal, or the like, and projects the pattern light onto the target object by a projection lens. In the present embodiment, the pattern light projected by projectors 51 and 52 has a stripe shape in which the luminance changes in a sinusoidal wave shape.

Measurement camera 53 is a digital camera including an imaging element as in part camera 41. As illustrated in FIG. 3, measurement camera 53 is disposed apart from projector 51 (52) by prescribed distance Lp in the arrangement direction of the pattern light, and images the pattern light projected onto the target object. Measurement camera 53 performs the imaging based on the control signal from communicably connected control device 60, and transmits the imaging data acquired by the imaging to control device 60.

Image analysis section 62 measures the three-dimensional shape of the target object based on multiple imaging data acquired by the imaging of measurement camera 53. In the present embodiment, image analysis section 62 measures the three-dimensional shape of the target object by a phase shift method using the multiple imaging data each corresponding to the pattern light. It is noted that the phase shift method is known, and thus a specific description of the method is omitted.

Figure 4:
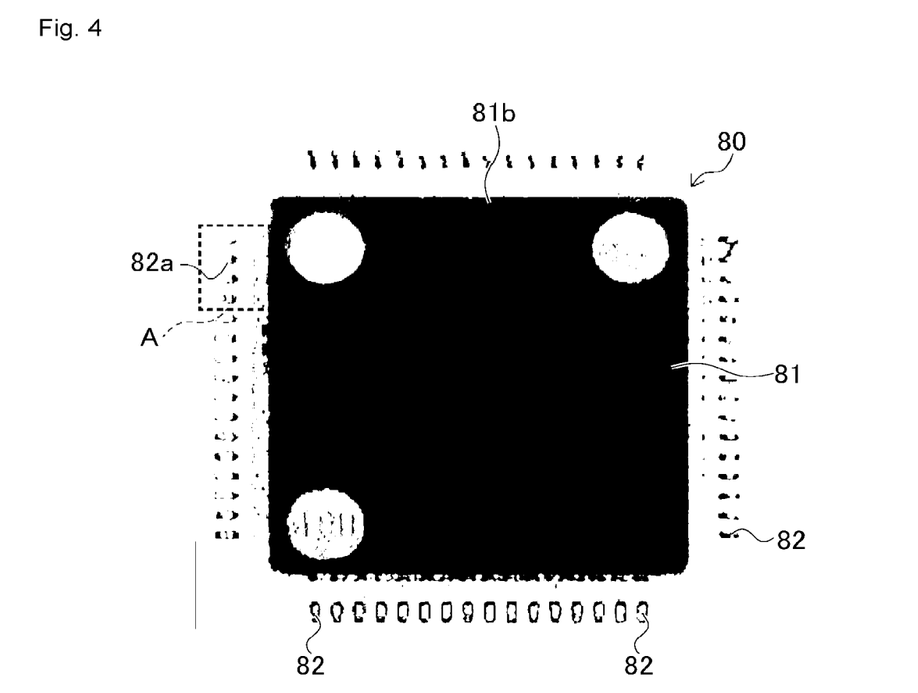
FIG. 4 is a diagram illustrating an inspection surface of an electronic component whose shape is measured.
Figure 5:
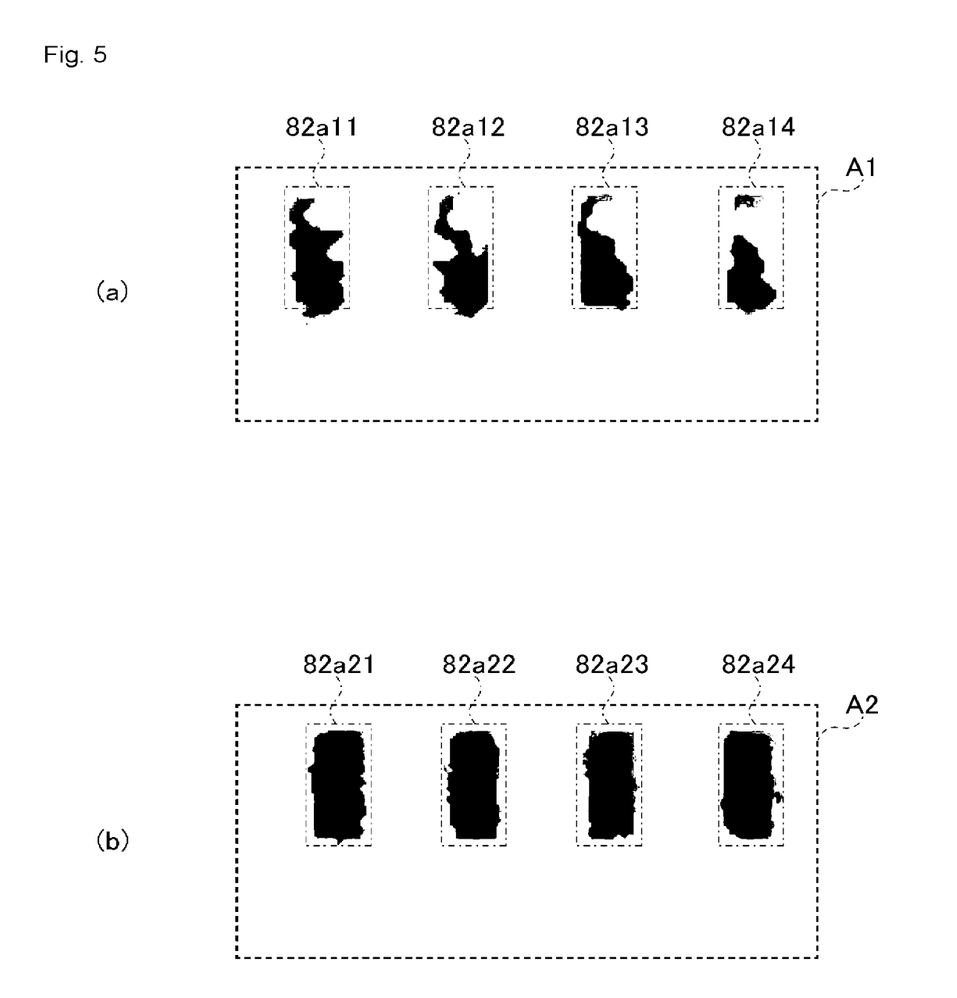
FIG. 5 is an enlarged view of a portion corresponding to region A in FIG. 4 among imaging data captured at different shutter speeds.

FIG. 4 illustrates the three-dimensional shape of electronic component 80 visualized by image analysis section 62, and a height (Z coordinate) of each portion is illustrated by the luminance (shade in FIG. 4) of each portion. FIG. 5 is an enlarged view of a portion corresponding to region A of the three-dimensional shape of electronic component 80 in FIG. 4. (a) of FIG. 5 and (b) of FIG. 5 are different from each other in that the images are visualized based on the imaging data captured at different shutter speeds. In (a) of FIG. 5 and (b) of FIG. 5, regions 82*a*11 to 82*a*14 and 82*a*21 to 82*a*24 surrounded by a one-dot chain line are regions in which the visualized image of each lower surfaces 82*a* of four leads 82 included in regions A1 and A2 exist, respectively. That is, it is ideal that the visualized image of each lower surface 82*a* of four leads 82 exists over the entire region in regions 82*a*11 to 82*a*14 and 82*a*21 to 82*a*24. However, in all of regions 82*a*11 to 82*a*14 of (a) of FIG. 5 and regions 82*a*21 to 82*a*24 of (b) of FIG. 5, the visualized image of each lower surface 82*a* of four leads 82 does not exist over the entire region, and the image is missing. However, missing rates of the images in regions 82*a*21 to 82*a*24 in (b) of FIG. 5 are less than missing rates of the images in regions 82*a*11 to 82*a*14 in (a) of FIG. 5. The missing rate of the image is changed in accordance with the shutter speed when the imaging data as a basis is captured. Then, as the missing rate of the image is less, the accuracy of the image recognition is further improved, and it is required to select the shutter speed at which the missing rate of the image is minimized.

Figure 6:
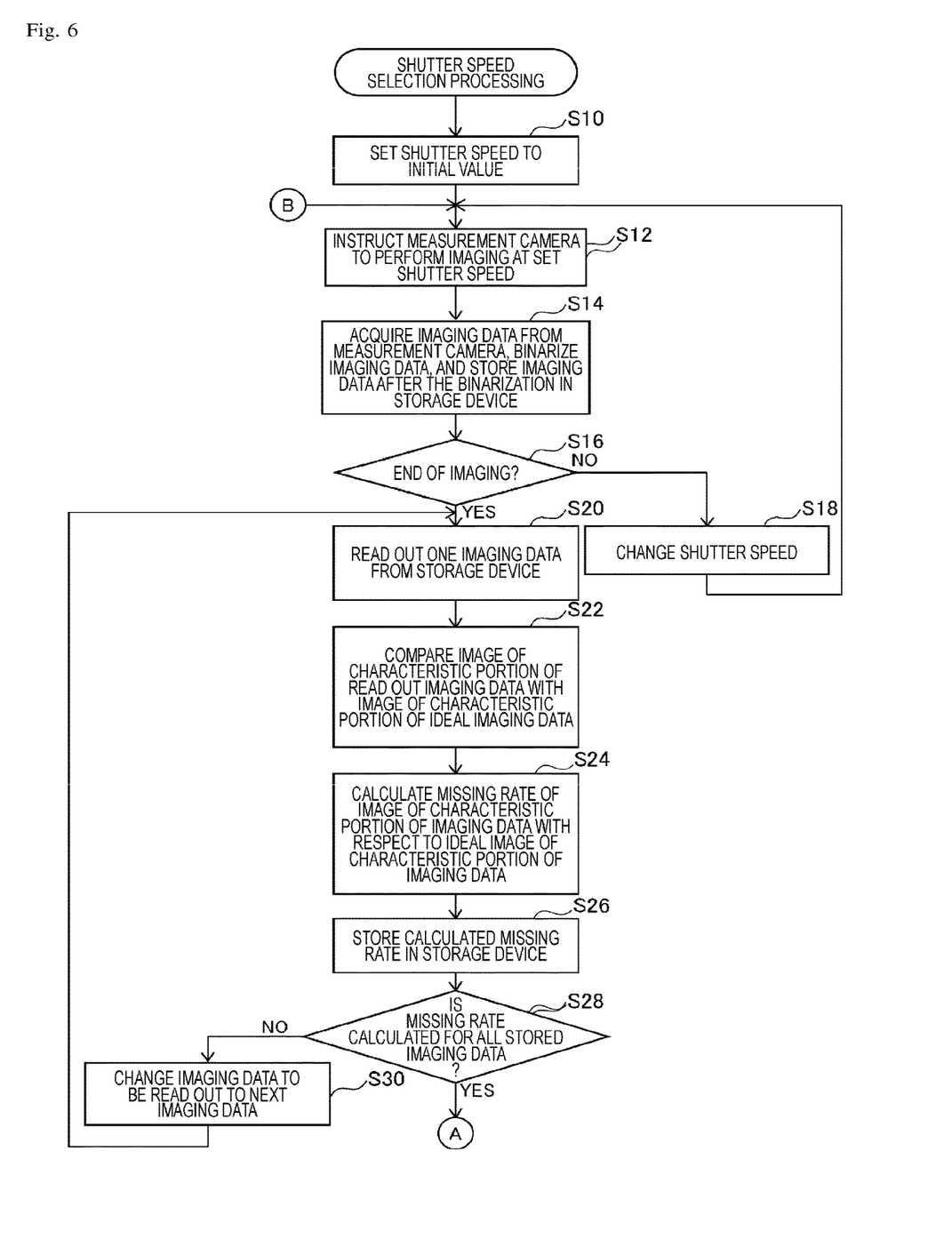
FIG. 6 is a flowchart illustrating a procedure of shutter speed selection processing executed by an image analysis section in FIG. 2.
Figure 7:
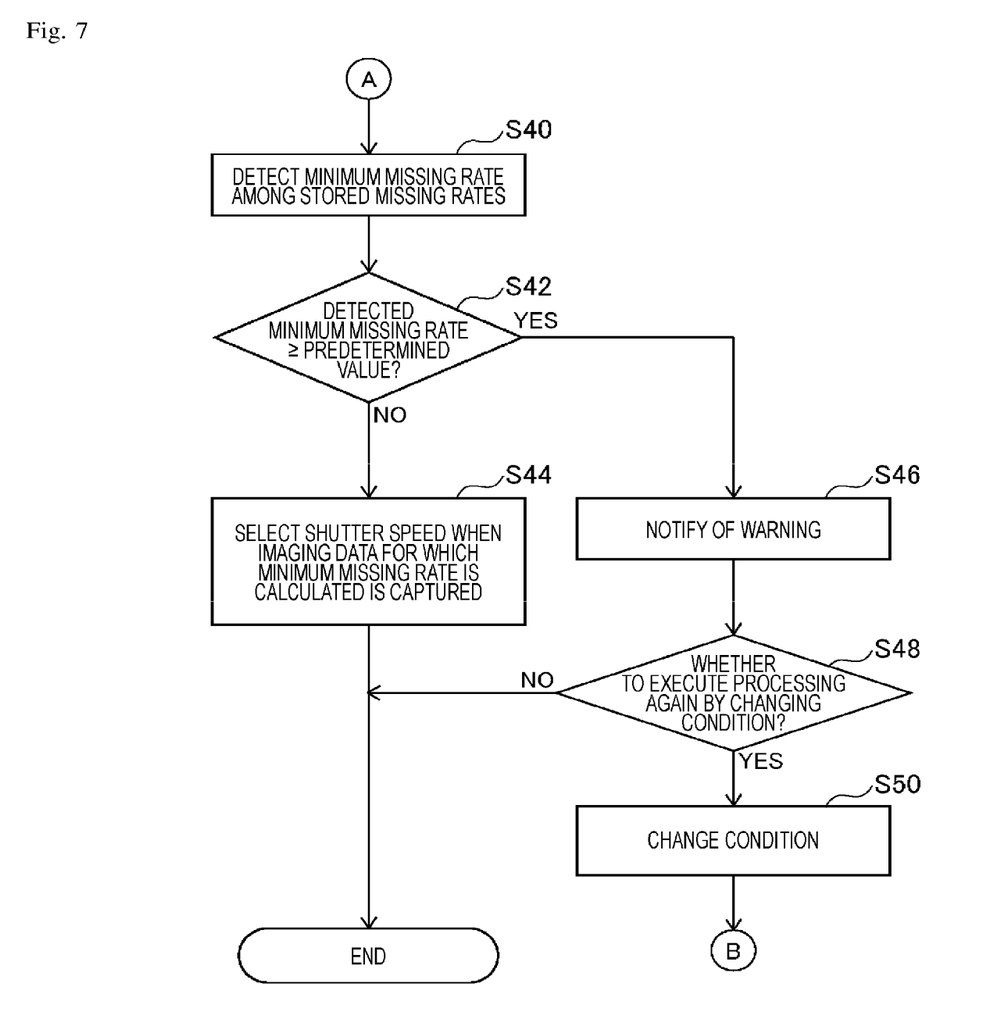
FIG. 7 is a flowchart illustrating a subsequent procedure of the shutter speed selection processing of FIG. 6.

FIGS. 6 and 7 illustrate a procedure of shutter speed selection processing executed by image analysis section 62, particularly CPU. Hereinafter, in the description of the procedure of each processing, a step is denoted by "S". The shutter speed selection processing is appropriately executed before starting mounting of the component, when changing the component to be mounted, when recognition device 50 including measurement camera 53 changes over time, or the like.

In FIG. 6, first, CPU sets the shutter speed of measurement camera 53 to an initial value (S10). In the present embodiment, since the instruction to image the component is given while changing the shutter speed at multiple stages between a predetermined lower limit speed and a predetermined upper limit speed, the initial value is, for example, the predetermined lower limit speed. The predetermined lower limit speed may be the lowest shutter speed that can be set by measurement camera 53, or may be a shutter speed higher than the lowest shutter speed. It is noted that, before the processing proceeds to S10, that is, before the shutter speed selection processing is executed, or immediately after the processing of S10, CPU causes suction nozzle 34 to pick up electronic component 80 that is the measurement target and positions mounting head 33 in each axial direction, thereby moving electronic component 80 to the measurement position above measurement camera 53.

Next, CPU instructs measurement camera 53 to perform the imaging at the set shutter speed (S12). In accordance with this instruction, measurement camera 53 images the inspection surface of electronic component 80 at the set shutter speed, and CPU acquires the generated imaging data from measurement camera 53, binarizes the imaging data, and stores the imaging data after the binarization in storage device 66 (see FIG. 2) (S14). The imaging data acquired from measurement camera 53 has, for example, any integer value of 0 to 255, that is, a luminance value for each pixel. The binarization is processing of setting a pixel having a luminance value exceeding a predetermined threshold to "1" and setting a pixel having a luminance value equal to or less than the predetermined threshold to "0". After the binarization, the pixel having the value of "0" is determined as a missing pixel, and the pixel having the value of "1" is determined as a non-missing pixel. As a result, it is easier to determine the missing pixel than to determine the imaging data before the binarization. It is noted that, although the imaging data that is a binarization target is the imaging data directly acquired from measurement camera 53 in S14, the imaging data that is the binarization target is actually data indicating the three-dimensional shape visualized based on the imaging data directly acquired from measurement camera 53. This description is made not to complicate the description.

Next, CPU determines whether to end the imaging by measurement camera 53 (S16). This determination is made by determining whether the shutter speed is changed to the predetermined upper limit speed. In this determination, in a case where the shutter speed is not changed to the predetermined upper limit speed, that is, in a case where the imaging by measurement camera 53 does not end (S16: NO), CPU changes the current shutter speed to a shutter speed increased by a predetermined step size (S18), and then returns the processing to S12. Thereafter, CPU continues the processing of instructing measurement camera 53 to perform the imaging (S12) while subsequently changing the shutter speed (S18), and binarizing the imaging data acquired from measurement camera 53 in accordance with the instruction and then storing the imaging data after the binarization in storage device 66 (S14) until the shutter speed reaches the predetermined upper limit speed. When the shutter speed reaches the predetermined upper limit speed, CPU determines to end the imaging by measurement camera 53 (S16: YES), and proceeds with the processing to S20. It is noted that the predetermined step size to be increased in S18 may be constant from the predetermined lower limit speed to the predetermined upper limit speed, or may be changed in several steps in the middle.

In S20, CPU reads out, from storage device 66, one imaging data among multiple imaging data after the binarization stored in S14. In subsequent S22, CPU compares an image of a characteristic portion of the read out imaging data with an image of a characteristic portion of ideal imaging data. It is needless to say that the ideal imaging data that is a comparison target is obtained by binarizing the ideal imaging data. In the present embodiment, the characteristic portion is a portion of the inspection surface to be subjected to height measurement, specifically, lower surface 82a of each lead 82. When electronic component 80 that is the measurement target and the inspection surface thereof are confirmed and the measurement position of electronic component 80 above measurement camera 53 is confirmed, information specifying the characteristic portion such as the coordinates and the size of the characteristic portion in the imaging data acquired from measurement camera 53 is confirmed. Accordingly, when the information specifying the characteristic portion in the imaging data is stored in storage device 66 in advance, CPU can specify the characteristic portion in the imaging data based on the read out information in S22, and can easily compare the image included in the specified characteristic portion in the read out imaging data with the image included in the specified characteristic portion in the ideal imaging data.

Next, CPU calculates the missing rate of the image included in the specified characteristic portion of the read out imaging data with respect to the image included in the specified characteristic portion of the ideal imaging data (S24). Now, the imaging data that is a processing target is the imaging data illustrated in (a) of FIG. 5. However, (a) of FIG. 5 illustrates only the imaging data included in partial region A1 of the entire imaging data. In (a) of FIG. 5, it is assumed that the specified characteristic portions are regions 82a11 to 82a14. In (a) of FIG. 5, since a dark portion included in the imaging data, that is, a portion in which the image is not missing corresponds to "1" after the binarization, and a light portion, that is, a portion in which the image is missing corresponds to "0" after the binarization, the missing rate of the image in each of regions 82a11 to 82a14 is calculated as a value between 20% to 50%. It is noted that the specified characteristic portion exists not only over regions 82a11 to 82a14 but also over the entire region corresponding to each lower surface 82a of all leads 82, and the missing rate is calculated for each of the entire regions. In a case where the characteristic portion specified in this way exists over multiple regions in the imaging data, multiple missing rates are calculated by calculating the missing rate for each region. In a case where the multiple missing rates are calculated, in the present embodiment, CPU further calculates an average value of the calculated multiple missing rates.

Next, CPU stores the calculated missing rate in storage device 66 (S26). In this case, in a case where there are multiple calculated missing rates, the average value is calculated as described above, but in S26, CPU stores the calculated average value of the missing rates. In addition, the shutter speed of the imaging data, which is the calculation basis of the missing rate, is also stored in association with the missing rate.

Next, CPU determines whether the missing rate is calculated for all the stored imaging data (S28). In this determination, in a case where the imaging data for which the missing rate is not calculated still remains in storage device 66 (S28: NO), CPU changes the imaging data that is a readout target to the next imaging data (S30), and then returns the processing to S20. Thereafter, CPU continues the processing of reading out the imaging data (S20) while subsequently changing the imaging data that is the readout target (S30), calculating the missing rate of the characteristic portion specified based on the read out imaging data (S22, S24), and storing the calculated missing rate in storage device 66 (S26) until there is no more imaging data stored in storage device 66. When there is no more imaging data for which the missing rate is not calculated in storage device 66 (S28: YES), CPU proceeds with the processing to S40 of FIG. 7.

In S40, CPU detects the minimum missing rate among the multiple missing rates stored in storage device 66. (b) of FIG. 5 illustrates the imaging data captured at the shutter speed different from the shutter speed of (a) of FIG. 5 as described above. Since the missing rates of the images in regions 82a21 to 82a24 in (b) of FIG. 5 are calculated as values between several % and 10%, when it is assumed that the missing rate of the image of the specified characteristic portion other than regions 82a21 to 82a24 in the imaging data also has the same tendency, (the average value of) the missing rate of the image of the specified characteristic portion in the imaging data is less than (the average value of) the missing rate for the imaging data of (a) of FIG. 5. In this way, since the missing rate of the image of the characteristic portion specified based on the imaging data is changed, the minimum missing rate can be detected.

Next, CPU determines whether the detected minimum missing rate is equal to or greater than a predetermined value (example of a "predetermined second threshold") (S42). The predetermined value is the maximum value of the missing rate of the image of the characteristic portion allowable for image analysis section 62 to perform the image analysis of the characteristic portion specified based on the imaging data. Accordingly, in S42, CPU determines whether the missing rate of the image of the characteristic portion exceeds an allowable range for performing the image analysis of the characteristic portion even when the missing rate of the image is the minimum. In the determination of S42, in a case where the detected minimum missing rate is less than the predetermined value (S42: NO), that is, in a case where the minimum value of the missing rate of the image of the characteristic portion is within the allowable range for performing the image analysis of the characteristic portion, CPU selects the shutter speed when the imaging data for which the minimum missing rate is calculated is captured (S44). As described above, since the shutter speed is also stored in storage device 66 in association with the calculated missing rate, in S44, CPU reads out and selects the shutter speed associated with the detected minimum missing rate. The selected shutter speed is stored in storage device 66 as the shutter speed of measurement camera 53 when the mounting of the component is started. After the processing of S44, CPU ends the shutter speed selection processing.

On the other hand, in the determination of S42, in a case where the detected minimum missing rate is equal to or greater than the predetermined value (S42: YES), that is, in a case where the minimum value of the missing rate of the image of the characteristic portion exceeds the allowable range for performing the image analysis of the characteristic portion, CPU notifies an operator of this fact in order to warn the operator (S46). The notification of the warning is performed by, for example, displaying a warning message on the display included in recognition device 50. Alternatively, the warning may be issued by generating sound. Further, the warning may be issued simultaneously by display and sound.

Next, CPU inquires of the operator whether to execute the processing from S12 again by changing a condition (S48). As a method for making the inquiry, a method for displaying on the display, a method for issuing sound, a method for performing both display and sound issuing, and the like are conceivable, similarly to the notification of the warning in S46. In a case where the operator rejects to execute the processing again by changing the condition in response to the inquiry in S48 (S48: NO), CPU ends the shutter speed selection processing. On the other hand, in a case where the operator accepts to execute the processing again by changing the condition (S48: YES), CPU changes the condition in accordance with the instruction of the operator (S50), and then returns the processing to S12 (FIG. 6). Specifically, as the change of the condition, the change of the predetermined lower limit speed and the predetermined upper limit speed to another predetermined value, the change of the predetermined step size increased in S18 to another predetermined value, the change of a lighting condition, such as the lighting intensity or the lighting angle, and the like are conceivable.

As described above, recognition device 50 of the present embodiment is a recognition device for recognizing the state of lower surface 82a of each lead 82 of electronic component 80 to be mounted on circuit board 70. Recognition device 50 includes projectors 51 and 52 that apply light to electronic component 80 including lower surface 82a of lead 82, measurement camera 53 that images electronic component 80 that has received the light applied by projectors 51 and 52, and image analysis section 62 that performs the image analysis on the imaging data, which is captured by measurement camera 53 and acquired from measurement camera 53, to recognize the state of lower surface 82a of lead 82 of electronic component 80. Then, image analysis section 62 is configured to execute instruction processing (S10 to S18) of instructing measurement camera 53 to image electronic component 80 while changing the shutter speed of measurement camera 53 at the multiple stages between the predetermined lower limit speed and the predetermined upper limit speed, calculation processing (S20 to S30) of comparing the image of lower surface 82a of each lead 82 included in each of the multiple imaging data acquired from measurement camera 53 in accordance with the instruction processing with the ideal image of lower surface 82a of each lead 82 included in the ideal imaging data to calculate the missing rate at which the image of lower surface 82a of each lead 82 is missing with respect to the ideal image for each of the multiple imaging data, detection processing (S40) of detecting the imaging data having the minimum missing rate among the multiple missing rates calculated by the calculation processing, and selection processing (S44) of selecting the shutter speed used for capturing the imaging data detected by the detection processing.

As described above, in recognition device 50 of the present embodiment, it is possible to select the shutter speed at which the missing rate of the image of the created imaging data is the minimum. Further, since the selection of the shutter speed is automatically performed, it is possible to save the labor and time of the operator himself/herself for selecting the shutter speed. Therefore, the operator can use the idle time for others, and can use the time more effectively. Furthermore, since the shutter speed is automatically selected, the selection of the shutter speed does not vary for each operator and is stabilized.

In the present embodiment, circuit board 70 is an example of a "board". Projectors 51 and 52 are examples of a "light source". Measurement camera 53 is an example of an "imaging device". Electronic component 80 is an example of a "component". Lower surface 82a of each lead 82 is an example of a "predetermined characteristic portion". Image analysis section 62 is an example of an "image analysis device".

It is noted that, in the present embodiment, the minimum missing rate is detected in S40, and the shutter speed when the imaging data for which the minimum missing rate is calculated is captured is selected in S44, but the configuration is not limited to this. A threshold (example of a "predetermined first threshold") of the missing rate may be determined in advance based on the allowable missing rate, and the shutter speed when the imaging data in which the missing rate is equal to or less than the predetermined threshold is captured may be selected. In this case, in a case where it is calculated that the shutter speed is equal to or less than the predetermined threshold in certain imaging data, the shutter speed when the imaging data is captured may be selected, and the detection processing for the remaining imaging data may be stopped.

In addition, in the present embodiment, the instruction to image the component is given while changing the shutter speed at the multiple stages between the predetermined lower limit speed and the predetermined upper limit speed, and the detection processing is executed after the imaging of all the steps ends, but the configuration is not limited to this. After the imaging is performed at a certain shutter speed, the processing of S22 to S26 may be performed on the imaging data, and then the instruction to perform the imaging at the next shutter speed may be given. In this case, after the imaging is performed at a certain shutter speed, the missing rate of the imaging data is calculated, and when it is detected that the missing rate is equal to or less than the predetermined threshold, the shutter speed when the imaging data is captured is selected, and the imaging at the remaining shutter speed stages is stopped, and when it is detected that the missing rate is greater than the predetermined threshold, the instruction to perform the imaging at the next shutter speed stage may be given.

It is noted that the present disclosure is not limited to the embodiment described above, and various modifications can be made without departing from the spirit thereof.

(1) In the embodiment described above, recognition device 50 is provided in component mounting machine 1, but the configuration is not limited to this, and at least image analysis section 62 of recognition device 50 may be provided outside component mounting machine 1. Specifically, for example, PC may be connected to component mounting machine 1, and the shutter speed selection processing (FIGS. 6 and 7) executed by image analysis section 62 may be executed by PC.

(2) In the embodiment described above, the component that is the recognition target of recognition device 50 is electronic component 80 actually to be mounted on circuit board 70 by component mounting machine 1, and the imaging data used by recognition device 50 as the basis of the image recognition is captured by measurement camera 53 in the process of mounting electronic component 80. However, the configuration is not limited to this, and the imaging data of the component picked up by a nozzle provided in an external component data creation device that is not incorporated in a mounting line may be acquired by using an imaging device provided in the component data creation device, and a recognition device (or another device connected to the component data creation device) provided in the component data creation device may perform the image analysis.

(3) In the embodiment described above, lower surface 82a of each lead 82 provided in electronic component 80 is adopted as the characteristic portion for calculating the missing rate of the image, but it is needless to say that the configuration is not limited to this.

(4) In the embodiment described above, the image used by recognition device 50 for the image recognition is the three-dimensional image visualized by the phase shift method, but the method used for visualizing the three-dimensional image is not limited to the phase shift method. In addition, the image is not limited to the three-dimensional image, and may be a two-dimensional image, that is, the imaging data itself acquired from measurement camera 53.

REFERENCE SIGNS LIST

1: component mounting machine, 33: mounting head, 34: suction nozzle, 50: recognition device, 51, 52: projector, 53: measurement camera, 60: control device, 61: mounting control section, 62: image analysis section, 66: storage device, 67: input/output interface, 68: motor control circuit, 69: imaging control circuit, 70: circuit board, 80: electronic component, 82: lead, 82a: lower surface

The invention claimed is:

1. A recognition device for recognizing a state of a predetermined characteristic portion of a component to be mounted on a board, the recognition device comprising:
a light source configured to apply light to the component including the predetermined characteristic portion;
a camera configured to image the component that has received the light applied by the light source; and
processing circuitry configured to perform image analysis of imaging data, which is captured by the camera and acquired from the camera, to recognize the state of the predetermined characteristic portion of the component,
wherein the processing circuitry is configured to execute instruction processing of instructing the camera to image the component while changing a shutter speed of the camera between a predetermined lower limit speed and a predetermined upper limit speed,
calculation processing of retrieving, from memory, a reference image of the predetermined characteristic portion and performing a pixel-by-pixel comparison of an image of the predetermined characteristic portion included in each of multiple images acquired from the camera in accordance with the instruction processing with the reference image to calculate a missing rate representing a proportion of pixels of the predetermined characteristic portion that are absent in each of the multiple images relative to corresponding pixels in the reference image,
detection processing of detecting imaging data having a missing rate equal to or less than a predetermined first threshold among multiple missing rates calculated by the calculation processing, and
selection processing of automatically selecting a shutter speed used for capturing the imaging data detected by the detection processing as an optimal shutter speed for subsequent imaging of the predetermined characteristic portion.

2. The recognition device according to claim 1,
wherein the processing circuitry is further configured to execute warning notification processing of notifying of a warning in a case where the missing rate calculated by the calculation processing for the imaging data detected by the detection processing is equal to or greater than a predetermined second threshold.

3. The recognition device according to claim 1,
wherein the processing circuitry is further configured to execute binarization processing of binarizing the imaging data acquired from the camera, and
in the calculation processing, compare an image of the predetermined characteristic portion included in the imaging data after the binarization by the binarization processing with the reference image of the predetermined characteristic portion after the binarization to calculate the missing rate.

4. The recognition device according to claim 1,
wherein the processing circuitry is further configured to execute three-dimensional image generation processing of generating a three-dimensional image based on the imaging data acquired from the camera, and
perform image analysis of the three-dimensional image generated by the three-dimensional image generation processing to recognize the state of the predetermined characteristic portion of the component.

5. A recognition method for recognizing a state of a predetermined characteristic portion of a component to be mounted on a board, the recognition method comprising:
an image analysis operation of performing imaging via a camera configured to image the component that has received light applied by a light source configured to apply the light to the component including the predetermined characteristic portion and performing image analysis of imaging data acquired from the camera to recognize the state of the predetermined characteristic portion of the component,
wherein in the image analysis operation,
instruction processing of instructing the camera to image the component while changing a shutter speed of the camera between a predetermined lower limit speed and a predetermined upper limit speed,
calculation processing of retrieving, from memory, a reference image of the predetermined characteristic portion and performing a pixel-by-pixel comparison of an image of the predetermined characteristic portion included in each of multiple images acquired from the camera in accordance with the instruction processing with the reference image to calculate a missing rate representing a proportion of pixels of the predetermined characteristic portion that are absent in each of the multiple images relative to corresponding pixels in the reference image,
detection processing of detecting imaging data having a missing rate equal to or less than a predetermined first threshold among multiple missing rates calculated by the calculation processing, and
selection processing of automatically selecting a shutter speed used for capturing the imaging data detected by the detection processing as an optimal shutter speed for subsequent imaging of the predetermined characteristic portion are executed.

6. The recognition device according to claim 1,
wherein the predetermined characteristic portion is a lower surface of a lead of the component,
wherein the reference image is a stored binarized image of the lower surface of the lead,
wherein the calculation processing comprises performing the pixel-by-pixel comparison using the stored binarized reference image and binarized images of the predetermined characteristic portion captured at each shutter speed,
wherein the missing rate is determined as a ratio of the number of pixels determined to be missing in the binarized image relative to the total number of pixels of the predetermined characteristic portion in the binarized reference image, and
wherein the selection processing comprises automatically selecting, as the optimal shutter speed, the shutter speed among the multiple shutter speeds that results in a smallest missing rate that is equal to or less than the predetermined first threshold, and storing the selected optimal shutter speed in memory for use in subsequent imaging of the predetermined characteristic portion.

* * * * *